US012432053B2

United States Patent
Minner et al.

(10) Patent No.: US 12,432,053 B2
(45) Date of Patent: Sep. 30, 2025

(54) EFFICIENT LENGTH PRESERVING ENCRYPTION OF LARGE PLAINTEXTS

(71) Applicant: MICRO FOCUS LLC, Santa Clara, CA (US)

(72) Inventors: Richard Todd Minner, Santa Clara, CA (US); Thomas J. Wu, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 235 days.

(21) Appl. No.: 18/132,113

(22) Filed: Apr. 7, 2023

(65) Prior Publication Data

US 2024/0340175 A1    Oct. 10, 2024

(51) Int. Cl.
*H04L 9/08* (2006.01)
*H04L 9/06* (2006.01)

(52) U.S. Cl.
CPC ............ *H04L 9/088* (2013.01); *H04L 9/0618* (2013.01)

(58) Field of Classification Search
CPC .............................. H04L 9/0618; H04L 9/088
See application file for complete search history.

(56) References Cited

U.S. PATENT DOCUMENTS

| | | | |
|---|---|---|---|
| 9,294,268 B2 | 3/2016 | Von Mueller | |
| 10,873,448 B2 * | 12/2020 | Murguia Cosentino | ...................... G09C 1/00 |
| 2011/0103579 A1 * | 5/2011 | Martin | ................... G06F 21/602 |
| | | | 714/E11.032 |
| 2013/0028410 A1 * | 1/2013 | Parrish | ................... H04L 9/0662 |
| | | | 380/28 |
| 2022/0311596 A1 * | 9/2022 | Boesgaard | ............ H04L 9/0625 |
| 2023/0113150 A1 * | 4/2023 | Bellare | ................. H04L 9/0637 |
| | | | 380/28 |
| 2023/0139104 A1 * | 5/2023 | Minematsu | ........... H04L 9/0637 |
| | | | 713/155 |
| 2024/0163077 A1 * | 5/2024 | Cooreman | ............ H04L 9/0618 |

FOREIGN PATENT DOCUMENTS

CN            108566270 B        10/2021

OTHER PUBLICATIONS

Perez-Resa, et al; A New Method for Format Preserving Encryption in High-Data Rate Communications; IEEE Access; Electronic and Communications Engineering Department, University of Zaragoza; Jan. 8, 2020; 14 Pages.

* cited by examiner

*Primary Examiner* — Mohamed A. Wasel
(74) *Attorney, Agent, or Firm* — Sheridan Ross P.C.

(57) ABSTRACT

A plaintext is received. For example, a plaintext may be a text record that is to be encrypted and then stored in a database. A determination is made to see if a size of the plaintext is above a threshold. The threshold is based on an efficiency of a Format Preserving Encryption (FPE) algorithm. In response to the size of the plaintext being above the threshold: the plaintext is divided into a plurality of blocks based on a block size; each of the blocks are individually encrypted using the FPE algorithm; and each of the blocks are stored as a single FPE cyphertext. This makes the FPE encryption process much more effacement than has previously been achieved. For example, the FPE process may be 30% more efficient depending on the size of the plain text.

20 Claims, 3 Drawing Sheets

EFFICIENT LENGTH PRESERVING ENCRYPTION OF LARGE PLAINTEXTS

FIELD

The disclosure relates generally to Format Preserving Encryption (FPE) and particularly to FPE algorithms that can be used to produce large cyphertexts.

BACKGROUND

Format Preserving Encryption (FPE) works well when the plaintext has a limited size. If the size of the plaintext becomes very long, traditional FPE algorithms become extremely inefficient. On the other hand, binary based encryption algorithms, while more efficient, expand the cyphertext size, which may be unacceptable for certain applications.

SUMMARY

These and other needs are addressed by the various embodiments and configurations of the present disclosure. The present disclosure can provide a number of advantages depending on the particular configuration. These and other advantages will be apparent from the disclosure contained herein.

A plaintext is received. For example, a plaintext may be a text record that is to be encrypted and then stored in a database. A determination is made to see if a size of the plaintext is above a threshold. The threshold is based on an efficiency of a Format Preserving Encryption (FPE) algorithm. In response to the size of the plaintext being above the threshold: the plaintext is divided into a plurality of blocks based on a block size; each of the blocks are individually encrypted using the FPE algorithm; and each of the blocks are stored as a single FPE cyphertext. This makes the FPE encryption process much more efficient than has previously been achieved. For example, the FPE process may be 30% more efficient depending on the size of the plain text.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

As discussed herein and in the claims, the term "above a threshold" can include being equal to the threshold.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
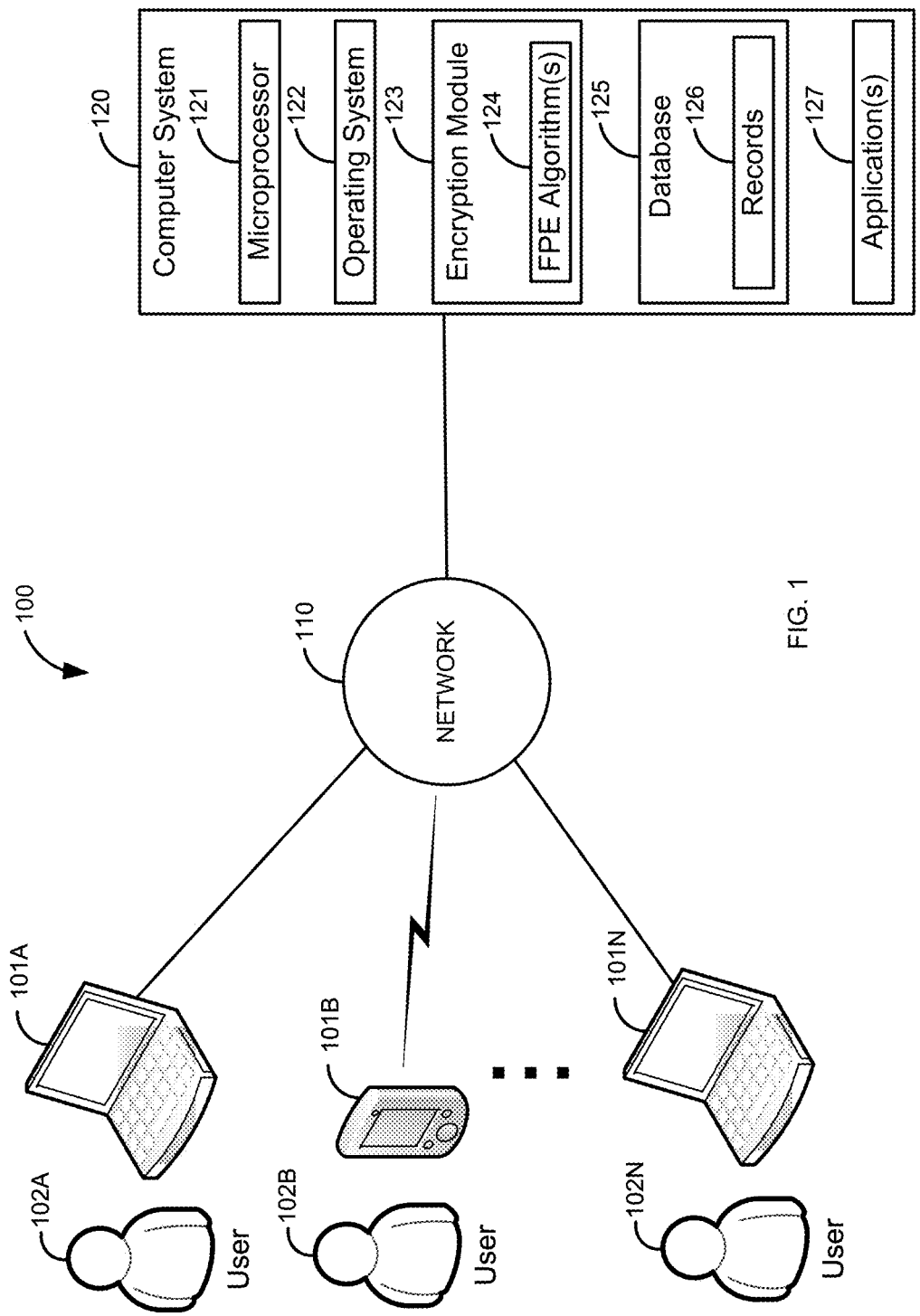
FIG. 1 is a block diagram of a first illustrative system for efficient format preserving encryption of long plaintexts.

FIG. 1 is a block diagram of a first illustrative system 100 for efficient format preserving encryption of long plaintexts. The first illustrative system 100 comprises communication devices 101A-101N, a network 110, and a computer system 120. In addition, users 102A-102N are shown for convenience.

The communication devices 101A-101N can be or may include any device that can communicate on the network 110, such as a Personal Computer (PC), a cellular telephone, a Personal Digital Assistant (PDA), a tablet device, a notebook device, a smartphone, a server, an embedded device, and/or the like. As shown in FIG. 1, any number of communication devices 101A-101N may be connected to the network 110, including only a single communication device 101. The communication devices 101A-101N may be used by the users 102A-102N to access/store data in the database 125/records 126 in the computer system 120.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The computer system 120 may be any communication device that can store encrypted information, such as, a server, a database server, application server, a file server, a PC, a smartphone, a laptop computer, an embedded device, and/or the like. In one embodiment, the computer system 120 may be accessible directly by the user. For example, the computer system 120 may be a smartphone of the user 102.

The computer system 120 further comprises a microprocessor 121, an operating system 122, an encryption module 123, a database 125, and application(s) 127. The microprocessor 121 may be any hardware microprocessor 121 that can execute instructions/computer programs. The operating system 122 may be any type of operating system 122, such as, Linux®, Microsoft Windows®, Apple macOS®, Android®, iOS® and/or the like.

The encryption module 123 can be any software that can be used to encrypt data. The encryption module 123 further comprises one or more Format Preserving Encryption (FPE) algorithms 124. A FPE algorithm 124 encrypts data where the size of the data is not expanded. Examples of FPE algorithms 124 may include, but are not limited to the following: FF1 and FF2. FF1 and FF2 may use the following as building blocks.

Cipher Bloc Chaining CBC: This FPE algorithm 124 uses simple chaining and solves the problem of plaintext patterns being visible in ciphertext; however a change in one plaintext block has limited change in ciphertext (e.g., a 1-bit change to the last block would only affect the last block of ciphertext).

Counter mode (CTR): the encryption component of GCM mode. CTR differs from CBC because the plaintext is no longer encrypted directly, instead the block cipher is used to construct a keystream, which is then added or XORed to the plaintext. Similar to CBC, alterations to the plaintext only affect those same affected bits in the ciphertext.

EME: (Encrypt-Mix-Encrypt): EMC has the property that any change to the plaintext will affect the entire ciphertext.

The database 125 may be any type of database that can store encrypted data, such as, a relational database, a hierarchical database, a network database, an object oriented database, a directory service3, a NoSQL database, a file system, and/or the like. The database 125 may be a database for one or more of the applications 127. The database 125 further comprises records 126. A record 126 comprises data for a specific type of information/users 102. For example, a record 126 may comprise user records, corporate records, transaction records, financial records, medical records, documents, and/or the like.

The application(s) 127 may be any type of application 127, such as, a financial application, an email application, a spreadsheet application, a document application, a security application, a corporate application, and/or the like. The application(s) 127 may use the database 125 to encrypt records 126 using the encryption module 123/FPE algorithm(s) 124.

Figure 2:
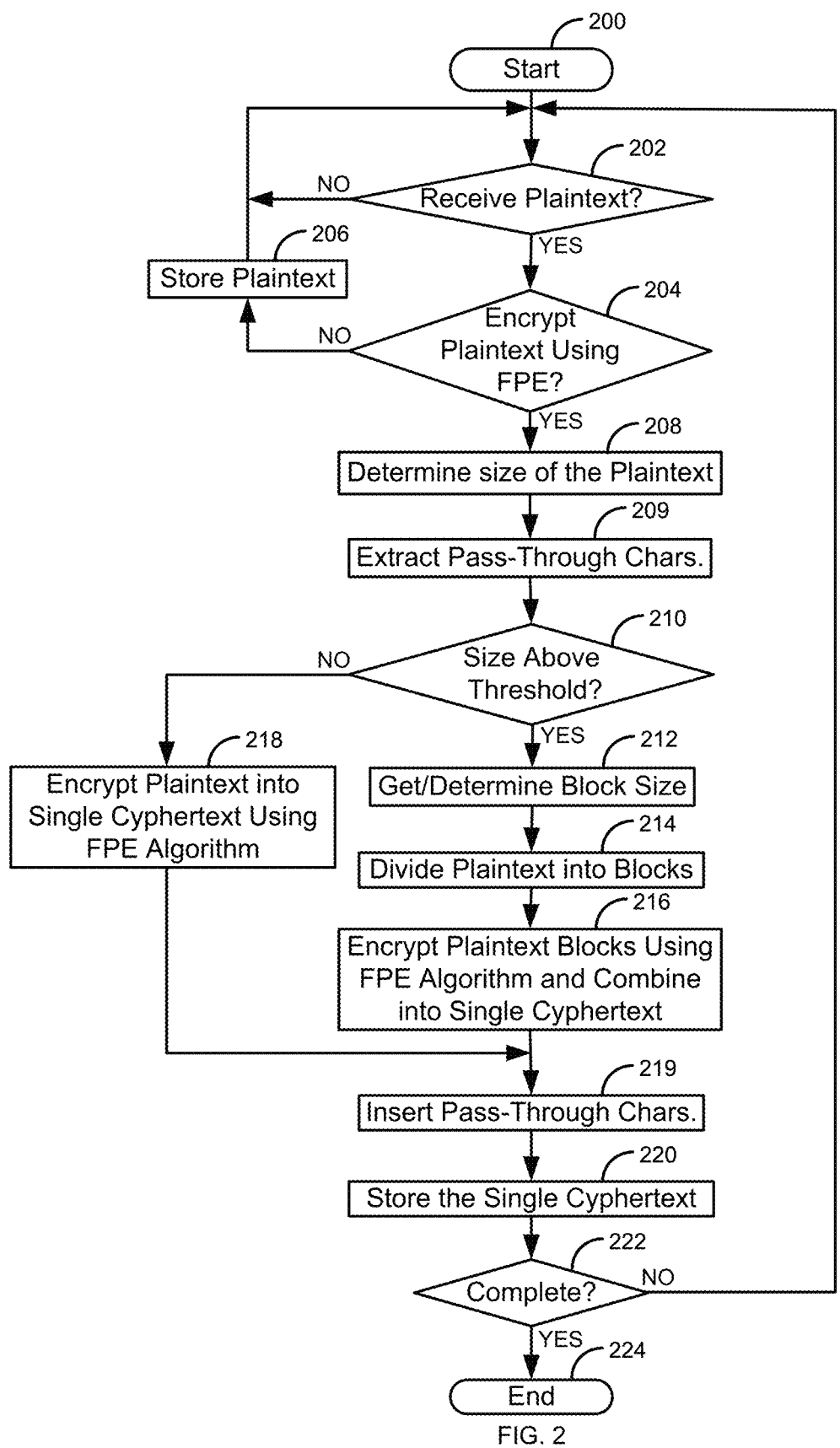
FIG. 2 is a flow diagram of a process for efficiently encrypting cyphertexts using Format Preserving Encryption (FPE).
Figure 3:
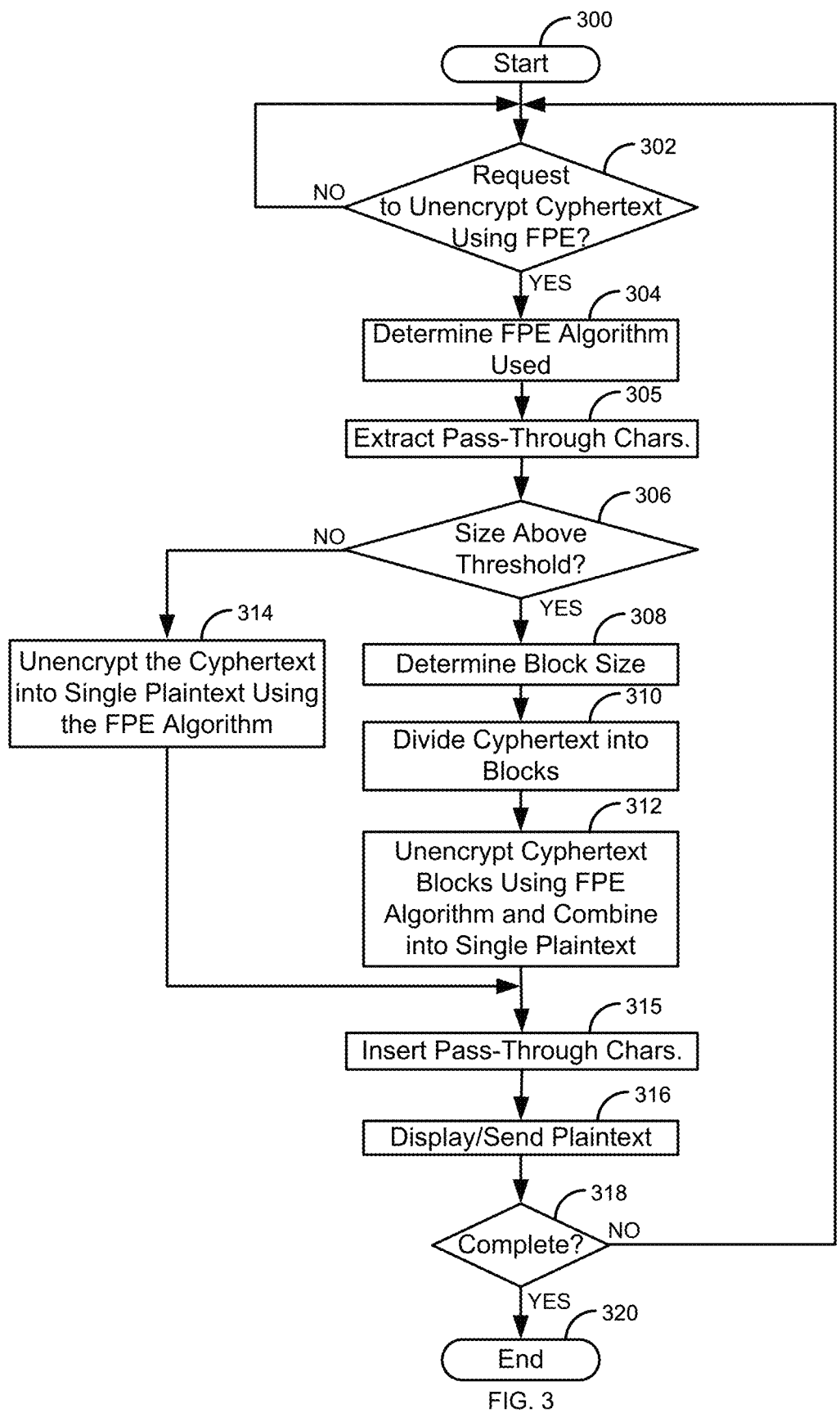
FIG. 3 is a flow diagram of a process for unencrypting cyphertexts.

FIG. 2 is a flow diagram of a process for efficiently encrypting long plaintexts using Format Preserving Encryption (FPE). Illustratively, the communication devices 101A-101N, the computer system 120, the microprocessor 121, the operating system 122, the encryption module 123, the FPE algorithm(s) 124, the database 125, the records 126 and the application(s) 127 are stored-program-controlled entities, such as a computer or microprocessor 121, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts in step 200. The encryption module 123 determines, in step 202, if a plaintext has been received (e.g., from the communication device 101). A plaintext is text data that has not been encrypted. For example, the plaintext may be new data that is to be written into a record 126 in the database 125 or modified data that is written to the record 126 in the database 125. If a plaintext has not been received in step 202, the process of step 202 repeats.

Otherwise, if the plaintext has been received, in step 202, the encryption module 123 determines, in step 204, if the plaintext is to be encrypted using a FPE algorithm 124. If the plaintext is not to be encrypted using a FPE algorithm 124, the plaintext is stored in step 206 (or could be encrypted using a non-FPE algorithm) and the process goes back to step 202. If the plaintext is to be encrypted using the FPE algorithm 124, in step 204, the encryption module 123 determines, in step 208, a size of the plaintext. For example, the size of the plaintext may be twenty megabytes long.

Pass-through characters are extracted in step 209. FPE algorithms 124 often support the possibility of excluding certain characters from the encryption process. For example, an FPE ciphertext for a credit card such as "1111-2222-3333-4444" may encrypt to "3710-4829-4338-8122", where the dashes are passed through unchanged; only the digits participate in the conversion from characters to and from an internal numeric value to be protected. The process whereby such pass-through characters are extracted and then later re-inserted is itself linear, so there is no performance benefit in applying such pass-through processing to the divided blocks of the present invention. Rather, pass-through processing can be done before and after the block division and combining process. As such, the choice of block size, and the block division itself, will consider only the plaintext characters to be protected.

The encryption module 123 determines, in step 210, if the size of the plaintext is above a threshold. The threshold may be based on one or more FPE algorithms 124. As the size of the plaintext increases, FPE algorithms 124 become much less efficient and thus can consume more processing resources than are necessary.

A typical FPE algorithm 124 converts a sequence of characters of some specific alphabet (say, 62 characters comprising uppercase and lowercase letters, plus ten digits) into a single large numeric value, which is then encrypted to a numeric ciphertext value, which is then converted back into a (generally different) sequence of characters from the same or similar alphabet. These conversions from sequences to/from numeric values cannot be done in linear time (O(n)) due to the required numeric calculations. Above a certain sequence length, it is more efficient to divide the sequence into blocks (smaller sequences of characters), apply the FPE algorithm 124 to each block to produce a series of ciphertext blocks, and then cryptographically combine those ciphertext blocks into a single ciphertext character sequence, with length matching the original (long) plaintext. The combining of ciphertext blocks can be done in linear time, so that the entire end-to-end algorithm becomes effectively linear time, O(n) in the length of the full plaintext. This improves the speed of the microprocessor 121 when using an FPE algorithm 124.

Several factors will affect the length threshold above which the multi-block approach will perform better than a single FPE operation applied to the complete original plaintext, including: the size of the specific FPE character alphabet to be converted to/from numeric values; the relative constant time cost of the underlying FPE algorithm 124 (applied to the blocks) versus the time per block for combining separate ciphertext blocks.

The efficiencies of different FPE algorithms 124 varies. Thus, the block size of a particular FPE algorithm 124 may be different because of the specific characteristics of the FPE algorithm 124 (e.g., the FPE algorithm 124 uses CBC). The efficiency of different FPE algorithms 124 may be defined using a threshold in a lookup table as shown below in Table 1.

TABLE 1

| Plaintext Size Threshold (Bits) | Divide into Blocks Threshold | Block Size (Bits) |
|---|---|---|
| Up to 1,048,576 | Encrypt Without Dividing | N/A |
| 1,048,567 and above | FPE Algorithm With Dividing | 256 |

The threshold is used to determine a block size where the plaintext is divided into blocks and each individual block is encrypted using the selected FPE algorithm 124. By using blocks, the FPE process becomes much more efficient than if the whole plaintext is processed at one time using the FPE algorithm 124. This example assumes a single FPE algorithm 124 is used. However, the process will work with multiple FPE algorithms 124. While the plaintext size and block size are described using bits, the plaintext size/block size may be based on bytes. In addition, a user may define a threshold/block size. If the size of the plaintext is not above (or equal to) the threshold (e.g., 1,048,576 bits) in step 210, the plaintext is encrypted, in step 218, into a single cyphertext using the FPE algorithm 124 (e.g., a default FPE algorithm 124) and the process goes to step 219 where pass-through characters are inserted (the pass-through characters taken out in step 209).

Otherwise, if the size of the plaintext is above the threshold (e.g., 1,048,576 bits) in step 210, a block size is determined by the encryption module 123 in step 212. For example, as shown in Table 1, if the size of the plaintext is above 1,048,567 bits, the block size of step 212 would be 256 bits. The plaintext is divided into blocks using the block size in step 214. The process of dividing the blocks may start at the beginning or end of the plaintext. In one embodiment, an individual block size may vary based on fixed rules. Likewise, a last block may have a different size. Each block is encrypted using the FPE algorithm 124 (e.g., the FF2 algorithm 124) and then combined into a single cyphertext in step 216. The pass-through characters are reinserted in step 219. The cyphertext is then stored in step 220. For example, the cyphertext may be stored in a record 126 in the database 125.

The encryption module 123 determines, in step 222, if the process is complete. If the process is not complete in step 222, the process goes back to step 202. Otherwise, if the process is complete in step 222, the process ends in step 224.

FIG. 3 is a flow diagram of a process for unencrypting cyphertexts. The process starts in step 300. The encryption module 123 determines, in step 302, if a request to unencrypt a cyphertext that was encrypted using a FPE algorithm 124 has been received (e.g., from the communication device 101). If a request to unencrypt a cyphertext encrypted using a FPE algorithm 124 was not received in step 302, the process of step 302 repeats.

Otherwise, if a request to unencrypt a cyphertext using a FPE algorithm 124 was received in step 302, the encryption module 123 determines the FPE algorithm 124 used in step 304. The pass-through characters are extracted in step 305. If the size is not above the threshold (e.g., 1,048,576 bits using Table 1) in step 306, the full cyphertext is unencrypted using the determined FPE algorithm 124 in step 314 and the process goes to step 315 where the pass-through characters are inserted into the plaintext.

Otherwise, if the size of the cyphertext is above the threshold or in the threshold range, in step 306, the encryption module 123 determines the block size in step 308. For example, using Table 1, if the cyphertext size is above 1,048,567 bits, the block size would be 256 bits. The cyphertext is divided into the blocks in step 310. Each of the blocks are individually unencrypted using the FPE algorithm 124 and then combined into a single plaintext in step 312. The pass-through characters are inserted in step 315. The plaintext is then sent/displayed in step 316.

The encryption module 123 determines, in step 318, if the process is complete. If the process is not complete in step 318, the process goes back to step 302. Otherwise, if the process is complete in step 318, the process ends in step 320.

The processes described herein may be used on a single computer system 120 or via the network 110. For example, a user 102 may request to encrypt/unencrypt/access the records 126 in the database 125 using one or more of the FPE algorithms 124 from the communication device via a web page that is displayed on the communication device 101.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a plaintext;
remove pass-through characters from the plaintext to form a revised version of the plaintext having a size smaller than a size of the plaintext;
determine that the size of the revised version of the plaintext is above a threshold, wherein the threshold is based on an efficiency of a Format Preserving Encryption (FPE) algorithm; and
in response to the size of the revised version of the plaintext being above the threshold:
divide the revised version of the plaintext into a plurality of blocks based on a block size;
convert, by the FPE algorithm, each of the plurality of blocks into a corresponding numeric value;
encrypt, by the FPE algorithm, the corresponding numeric value of each of the blocks individually into a respective ciphertext value;
convert, by the FPE algorithm, each of the respective ciphertext values into a corresponding sequence of characters;
cryptographically combine each of the corresponding sequences of characters into a single ciphertext character sequence; and
store the single ciphertext character sequence.

2. The system of claim 1, wherein each of the revised version of the plaintext and ciphertext character sequence is free of the pass-through characters and wherein the microprocessor readable and executable instructions further cause the microprocessor to:
in response to the plaintext being less than the threshold:
encrypt the plaintext using the FPE algorithm; and
store the encrypted plaintext as a single ciphertext.

3. The system of claim 1, wherein the FPE algorithm comprises a plurality of FPE algorithms, wherein a first threshold for a first FPE algorithm of the plurality of FPE algorithms is different from a second threshold for a second FPE algorithm of the plurality of FPE algorithms, and wherein the threshold is the first threshold when the first FPE algorithm is applied to the revised version of the plaintext and the threshold is the second threshold when the second FPE algorithm is applied to the revised version of the plaintext.

4. The system of claim 3, wherein the block size is different depending on which one of the plurality of FPE algorithms is being used.

5. The system of claim 3, wherein the first and second FPE algorithms have different first and second thresholds based on different first and second efficiencies of the first and second FPE algorithms.

6. The system of claim 3, wherein the threshold is stored in a lookup table that comprises a plurality of thresholds for each of the plurality of FPE algorithms and wherein each of the plurality of thresholds are based on an efficiency of each respective FPE algorithm.

7. The system of claim 6, wherein the efficiency of each of the plurality of FPE algorithms is determined based on at least one of: a size of a specific FPE character alphabet to be converted to/from numeric values and a relative constant time cost of the respective FPE algorithm versus a time per block for combining separate ciphertext blocks.

8. A method comprising:
receiving, by a microprocessor, a plaintext;
removing, by the microprocessor, pass-through characters from the plaintext to form a revised version of the plaintext having a size smaller than a size of the plaintext;
determining, by the microprocessor, that the size of the revised version of the plaintext is above a threshold, wherein the threshold is based on an efficiency of a Format Preserving Encryption (FPE) algorithm; and
in response to the size of the revised version of the plaintext being above the threshold:
dividing, by the microprocessor, the revised version of the plaintext into a plurality of blocks based on a block size;
converting, by the microprocessor executing the FPE algorithm, each of the plurality of blocks into a corresponding numeric value;
encrypting, by the microprocessor executing the FPE algorithm, the corresponding numeric value of each of the blocks individually into a respective ciphertext value;
converting, by the microprocessor executing the FPE algorithm, each of the respective ciphertext values into a corresponding sequence of characters;
cryptographically combining each of the corresponding sequences of characters into a single ciphertext character sequence; and
storing, by the microprocessor, the single ciphertext character sequence.

9. The method of claim 8, wherein each of the revised version of the plaintext and ciphertext character sequence is free of the pass-through characters and further comprising:
in response to the plaintext being less than the threshold:
encrypting the plaintext using the FPE algorithm; and
storing the encrypted plaintext as a single ciphertext.

10. The method of claim 8, wherein the FPE algorithm comprises a plurality of FPE algorithms, wherein a first threshold for a first FPE algorithm of the plurality of FPE algorithms is different from a second threshold for a second FPE algorithm of the plurality of FPE algorithms, and wherein the threshold is the first threshold when the first FPE algorithm is applied to the revised version of the plaintext and the threshold is the second threshold when the second FPE algorithm is applied to the revised version of the plaintext.

11. The method of claim 10, wherein the block size is different depending on which one of the plurality of FPE algorithms is being used.

12. The method of claim 10, wherein the first and second FPE algorithms have different first and second thresholds based on different first and second efficiencies of the first and second FPE algorithms.

13. The method of claim 10, wherein the threshold is stored in a lookup table that comprises a plurality of thresholds for each of the plurality of FPE algorithms and wherein each of the plurality of thresholds are based on an efficiency of each respective FPE algorithm.

14. The method of claim 13, wherein the efficiency of each of the plurality of FPE algorithms is determined based on at least one of: a size of a specific FPE character alphabet to be converted to/from numeric values and a relative constant time cost of the respective FPE algorithm versus a time per block for combining separate ciphertext blocks.

15. A non-transient computer readable medium having stored thereon instructions that cause a processor to execute a method, the method comprising:
instructions to:
receive a plaintext;
remove pass-through characters from the plaintext to form a revised version of the plaintext having a size smaller than a size of the plaintext;
determine that the size of the revised version of the plaintext is above a threshold, wherein the threshold is based on an efficiency of a Format Preserving Encryption (FPE) algorithm; and
in response to the size of the revised version of the plaintext being above the threshold:
divide the revised version of the plaintext into a plurality of blocks based on a block size;
convert, by the FPE algorithm, each of the plurality of blocks into a corresponding numeric value;
encrypt, by the FPE algorithm, the corresponding numeric value of each of the blocks individually into a respective ciphertext value;
convert, by the FPE algorithm, each of the respective ciphertext values into a corresponding sequence of characters;
cryptographically combine each of the corresponding sequences of characters into a single ciphertext character sequence; and
store the single ciphertext character sequence.

16. The non-transient computer readable medium of claim 15, wherein each of the revised version of the plaintext and ciphertext character sequence is free of the pass-through characters and wherein the instructions further cause the processor to:
in response to the plaintext being less than the threshold:
encrypt the plaintext using the FPE algorithm; and
store the encrypted plaintext as a single ciphertext.

17. The non-transient computer readable medium of claim 15, wherein the FPE algorithm comprises a plurality of FPE algorithms, wherein a first threshold for a first FPE algorithm of the plurality of FPE algorithms is different from a second threshold for a second FPE algorithm of the plurality of FPE algorithms, and wherein the threshold is the first threshold when the first FPE algorithm is applied to the revised version of the plaintext and the threshold is the second threshold when the second FPE algorithm is applied to the revised version of the plaintext.

18. The non-transient computer readable medium of claim 17, wherein the block size is different depending on which one of the plurality of FPE algorithms is being used.

19. The non-transient computer readable medium of claim 17, wherein the first and second FPE algorithms have different first and second thresholds based on different first and second efficiencies of the first and second FPE algorithms.

20. The non-transient computer readable medium of claim 17, wherein the threshold is stored in a lookup table that comprises a plurality of thresholds for each of the plurality of FPE algorithms and wherein each of the plurality of thresholds are based on an efficiency of each respective FPE algorithm, wherein the efficiency of each of the plurality of FPE algorithms is determined based on at least one of: a size of a specific FPE character alphabet to be converted to/from numeric values and a relative constant time cost of the respective FPE algorithm versus a time per block for combining separate ciphertext blocks.

* * * * *